(12) United States Patent
Ferrari

(10) Patent No.: US 10,077,200 B2
(45) Date of Patent: Sep. 18, 2018

(54) CUTTING DEVICE FOR FORMING GOBS OF GLASS

(71) Applicant: BOTTERO S.P.A., Cuneo (IT)

(72) Inventor: Simone Ferrari, Cuneo (IT)

(73) Assignee: BOTTERO S.P.A., Cuneo (IT)

( * ) Notice: Subject to any disclaimer, the term of this patent is extended or adjusted under 35 U.S.C. 154(b) by 0 days.

(21) Appl. No.: 14/660,695

(22) Filed: Mar. 17, 2015

(65) Prior Publication Data
US 2015/0266764 A1    Sep. 24, 2015

(30) Foreign Application Priority Data

Mar. 18, 2014    (IT) .............................. TO2014A0219

(51) Int. Cl.
| | |
|---|---|
| *C03B 7/10* | (2006.01) |
| *C03B 7/084* | (2006.01) |
| *C03B 7/11* | (2006.01) |
| *C03B 7/094* | (2006.01) |

(52) U.S. Cl.
CPC .............. *C03B 7/084* (2013.01); *C03B 7/094* (2013.01); *C03B 7/10* (2013.01); *C03B 7/11* (2013.01); *Y02P 40/57* (2015.11)

(58) Field of Classification Search
CPC .................................... C03B 7/10; C03B 7/11
See application file for complete search history.

(56) References Cited

U.S. PATENT DOCUMENTS

| | | | | |
|---|---|---|---|---|
| 1,231,610 A | * | 7/1917 | Howard .................... | C03B 7/10 65/127 |
| 1,490,946 A | * | 4/1924 | Soubier .................... | C03B 7/10 65/303 |
| 1,525,190 A | * | 2/1925 | Lorenz ..................... | C03B 7/10 65/325 |
| 1,699,563 A | * | 1/1929 | Cramer .................... | C03B 7/10 65/304 |
| 2,090,082 A | * | 8/1937 | Wadsworth ............... | C03B 7/10 83/327 |
| 2,108,518 A | | 2/1938 | Wadsworth | |
| 2,259,763 A | * | 10/1941 | Meyers .................... | C03B 7/10 83/600 |

(Continued)

FOREIGN PATENT DOCUMENTS

| | | |
|---|---|---|
| CN | 1079720 A | 12/1993 |
| DE | 41 30 114 | 3/1993 |

(Continued)

OTHER PUBLICATIONS

Wikipedia entry "Hinge". Downloaded Sep. 27, 2017. pp. 1-6.*
International Search Report dated Oct. 29, 2014 corresponding to Italian Application No. ITT020140219; 7 pages.

*Primary Examiner* — John M Hoffmann
(74) *Attorney, Agent, or Firm* — Ohlandt, Greeley, Ruggiero & Perle, LLP

(57) ABSTRACT

A column of molten glass is cut transversely to make a plurality of glass gobs by means of a cutting device having an elongated piece orthogonal to a conveying direction of the column and carried by a moveable frame operated by a motor controlled by a unit to rotate the piece at either constant or variable speed in one or both directions of rotation about a fixed hinged axis orthogonal to the conveying direction of the glass column.

15 Claims, 4 Drawing Sheets

(56) References Cited

U.S. PATENT DOCUMENTS

| | | | | |
|---|---|---|---|---|
| 2,271,004 | A | * | 1/1942 | Gray .................... C03B 7/10 65/221 |
| 3,962,939 | A | * | 6/1976 | Stengle, Jr. ............ C03B 7/11 65/133 |
| 3,996,037 | A | * | 12/1976 | Wythe .................. C03B 7/10 65/133 |
| 5,269,828 | A | | 12/1993 | Tijerina-Ramos |
| 5,327,806 | A | * | 7/1994 | Houser ............... B23D 35/001 76/DIG. 11 |
| 5,336,289 | A | | 8/1994 | Yeom et al. |
| 2004/0194506 | A1 | * | 10/2004 | Ueda .................... C03B 7/005 65/29.11 |

FOREIGN PATENT DOCUMENTS

| | | | |
|---|---|---|---|
| DE | 101 39 671 | | 2/2003 |
| EP | 0365177 | | 4/1990 |
| GB | 904422 | * | 8/1962 |

\* cited by examiner

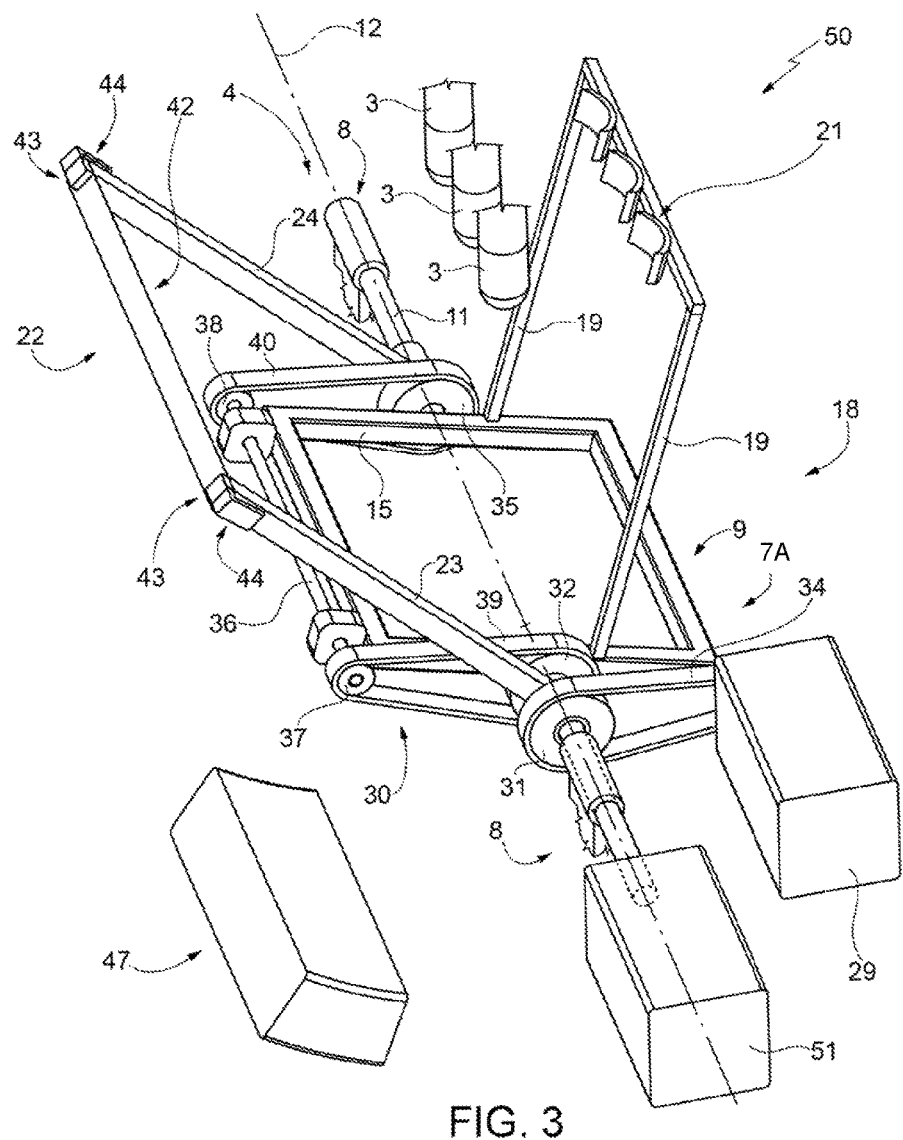
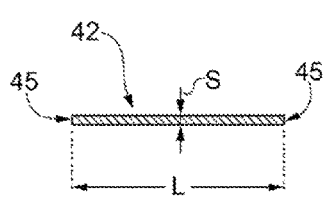
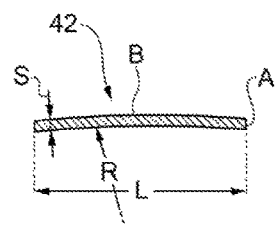
FIG. 3
FIG. 5
FIG. 6

CUTTING DEVICE FOR FORMING GOBS OF GLASS

The present invention relates to a cutting device for forming gobs of glass.

BACKGROUND OF THE INVENTION

For forming gobs of glass, for example intended to make hollow glass containers, it is known to form a column of molten glass, to convey the column in vertical direction and to cut the column itself transversely to form a sequence of gobs, which are then conveyed towards a respective forming mold.

Scissor devices are used for cutting the glass column, in which the glass column is crossed between a pair of blades moveable from and towards each other and towards an approached cutting position, in which they partially overlap causing the detachment of the gob.

Despite being used, such scissor devices are not very satisfactory because they do not allow to significantly increase the cutting speed or the production frequency and because, in all cases, they locally modify both the chemical-physical properties and the geometric features of the glass in the cutting zone, and consequently those of the formed gobs.

This is consequent to the fact that the cut is performed when the blades are arranged near a dead or motion reversion point, and thus during a step of deceleration of the blade themselves.

Consequently, the blades remain in contact with the glass for a relatively long time. Long contact times cause the localized cooling and thus the hardening of the glass because both blades are generally cooled by spraying a refrigerant liquid on each blade to prevent the sticking of the glass on the blades themselves.

The refrigerating liquid itself also strikes the glass column when the blade stroke is decreased in order to increase the production rate, and therefore the spraying members are close to the column. The hardening of the glass in the cutting zone is responsible for thermal-mechanical faults, typically known as "shear marks" which are found at the end on many finished products.

Additionally, during cutting, the blades transmit a flexural torque deriving from the partial overlapping during the step of cutting to the column; such a flexural torque changes the gob geometry in unexpected manner. Furthermore, the lower blade generates an imbalance of the newly cut gob which imposes the use of gob guiding surfaces.

Alternatively to the scissor devices, it is known, for example from patent application EP365177A1, to use single two-sided blade cutting devices. The blade is translated by means of reciprocating rectilinear motion and performs one cut during a delivery stroke and one cut during a return stroke.

Such devices allow to increase the cutting speed and the production rates because they reach the glass column when the translation speed is maximum, but the fact of using relatively thick blades, necessary to ensure cutting stability, do not solve the problem of flexural torque on the glass column. For this reason, such devices are always provided with gob guiding devices which intervene according to the direction of movement of the blade to define a rest or lateral reference for the glass.

In addition to the translating blades, it is known from U.S. Pat. No. 5,269,828 to use a disc blade, which rotates about a vertical axis parallel to the conveying direction of the column and has a recess delimited by the radial blade. Although such a solution allows to increase the cutting speed, it generates high thrusts on the column deriving from the fact that the blade is very thick, this being indispensable to guarantee the indeformability of the blade, the cutting edge of which must have a free peripheral stretch.

Furthermore, such a cutting device is not satisfactory if several columns must be cut at the same time. Indeed, in such conditions, the rotating blade cuts the gobs nearly simultaneously but at different speeds, because the columns are arranged at different distances from the rotation axis. The gobs thus made have deformations which are not only localized but are also different from one gob the next. For the same reasons, it is difficult to make efficient gob guiding devices.

SUMMARY OF THE INVENTION

It is the object of the present invention to make a cutting device which allows to solve the drawbacks illustrated above in simple, cost-effective manner, and in particular can ensure the geometric and dimensional consistency of the gobs and make uniform glass gobs all having the same chemical-physical properties.

According to the present invention, a cutting device for forming gobs of glass is provided, the device comprising conveying means for conveying at least one column of molten glass in a substantially vertical feeding direction; a reference frame, a single cutting blade and displacement means for moving said blade towards said feeding direction and through said column, characterized in that said blade consists of a piece elongated in a direction transverse to said feeding direction and in that it further comprises a moveable frame for supporting and moving said elongated piece; said moveable frame being hinged to said reference frame to rotate the piece about a fixed hinge axis substantially horizontal and orthogonal to said feeding direction; said displacement means comprising motorized actuator means to rotate said moveable frame about said hinge axis.

Preferably, in the device described above, the piece is elongated in a direction parallel to the hinge axis.

BRIEF DESCRIPTION OF THE DRAWINGS

The invention will now be described with reference to the accompanying drawings which illustrate a non-limitative embodiment thereof, in which:

FIG. 3 is a figure similar to FIG. 1 and shows a variant of a detail of FIG. 1.

FIG. 5 is a section view, with parts removed for clarity taken along line V-V in FIG. 1; and FIG. 6 shows a variant of a detail of FIG. 5.

DETAILED DESCRIPTION OF THE INVENTION

Figure 1:
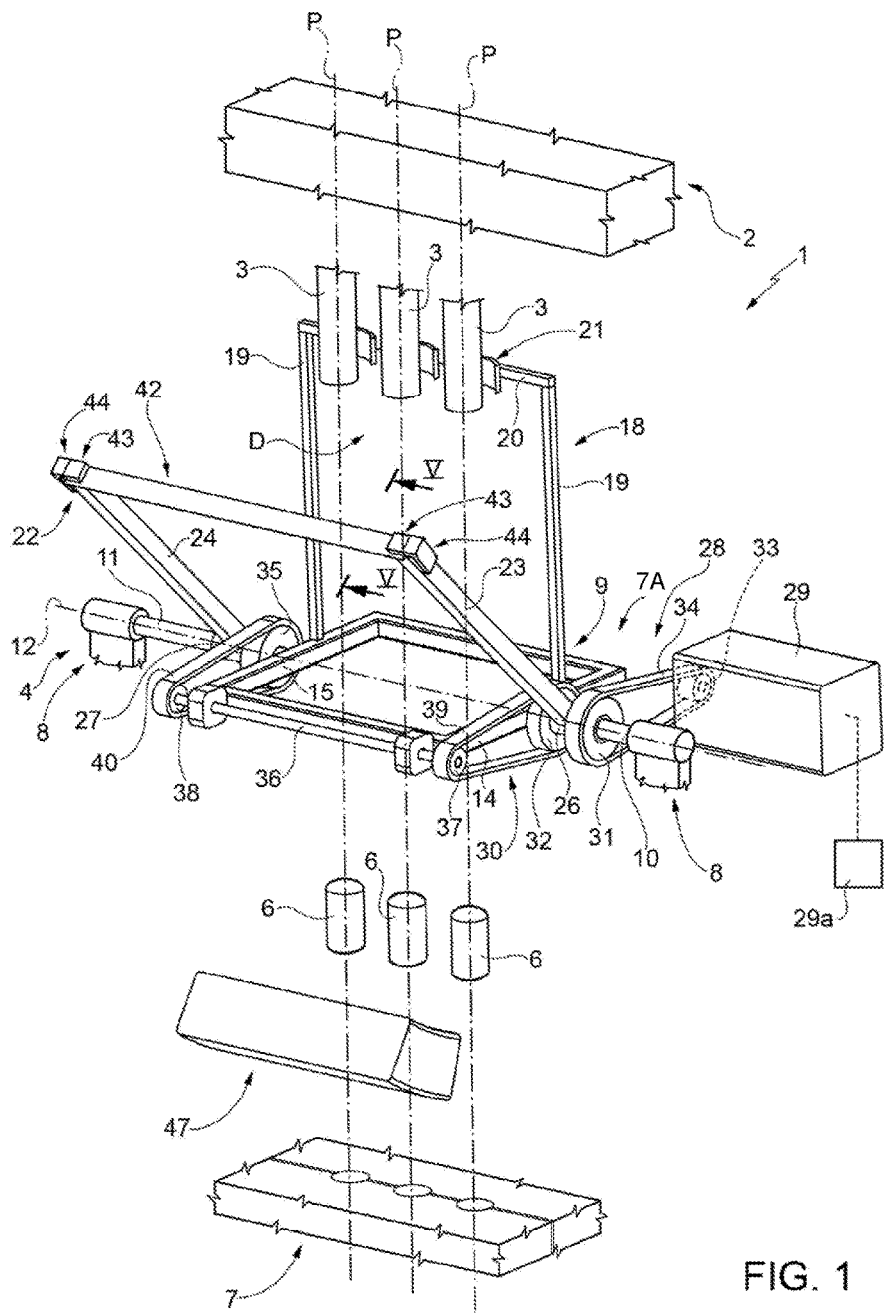
FIG. 1 shows diagrammatically and substantially in blocks a preferred embodiment of a cutting device according to the present invention fitted on a machine for making glass items diagrammatically and partially shown.

In FIG. 1, reference numeral 1 indicates a machine for forming hollow glassware, generally known as an I.S. machine, as a whole.

The machine 1 comprises a forming assembly 2 (known in itself), for conveying one or more molten glass columns 3, three in the described case, along respective vertical rectilinear conveying paths P lying on a common vertical plane, indicated by reference D.

The machine 1 further comprises a cutting device 4 arranged under the forming assembly 2 along the paths P to cut the columns 3 transversely and form a plurality of glass gobs 6 moveable by gravity towards a forming mold assembly 7 of the machine 1 itself.

Again with reference to FIG. 1, the device 4 comprises a frame 7, comprising, in turn, a fixed attachment structure (partially shown), an intermediate annular structure 9, quadrangular in the specific case, and two attachment pins 10 and 11.

The pins 10 and 11 extend in positions co-axially opposite to a fixed common axis 12 from respective sides 14 and 15 facing each other of the annular structure 9. In the particular described example, the pins 10 and 11 are integrally connected to the respective side 14,15, on one side and to the attachment structure 8 on the other.

Again in the particular described example, the axis 12 lays on the plane D and orthogonally intersects the conveying paths P.

The frame 7 finally comprises a gantry portion 18, which is integrally connected to the annular structure 9 and comprises, in turn, two vertical uprights 19 integrally connected one to the side 14 and the other to the side 15 in position distanced from the axis 12, and a crosspiece 20 connecting the two free upper ends of the upright 19 to each other. The crosspiece 20 carries a fixed device 21 coupled to it (known in itself and not described in detail), which guides the columns 3 and the gobs 6 during the step of making along the respective paths P.

Again with reference to FIG. 1, the cutting device 4 further comprises a moveable fork frame 22 which, in turn, comprises two arms 23 and 24, which have respective lower end portions coupled by means of respective hinges 26 and 27 to corresponding intermediate portions of the pins 10 and 11 in rotational manner about axis 12 and in axially fixed position.

The arms 23 and 24 are rotational about axis 12 and with respect to the annular structure 9 under the bias of a motorized actuating assembly 28 comprising a single motor 29 and a mechanical transmission 30 actuated by the motor 29 itself and a control unit 29A of the motor 29.

In the specific case, the transmission 30 is a chain transmission and comprises two toothed wheels 31 and 32 idly arranged on the pin 10 on opposite side parts of the hinge 26 and of the arm 23 and both coupled in angularly integral manner with the arm 23 itself. The wheel 31 is connected to a pinion 33 fitted on the shaft of the motor 29 by means of a chain 34, while the wheel 32 is angularly coupled to a second wheel 35 idly fitted on the pin 11 and angularly integral with the arm 24 by means of a transmission shaft 36 parallel to the axis 12. The shaft 36 is coupled to the annular structure 9 in rotational manner and in axially fixed position and carries two toothed wheels 37 and 38 angularly coupled to the wheel 32 and to the wheel 35, respectively, by means of respective chains 39 and 40. In this manner, the arms 23 and 24 are angularly integral to each other and rotate about axis 12 at the same time.

According to a variant, the chains 34,39 and 40 are carried by the toothed belts, while according to a further variant (not shown) the transmission 30 is replaced by a gear transmission.

Figure 4:
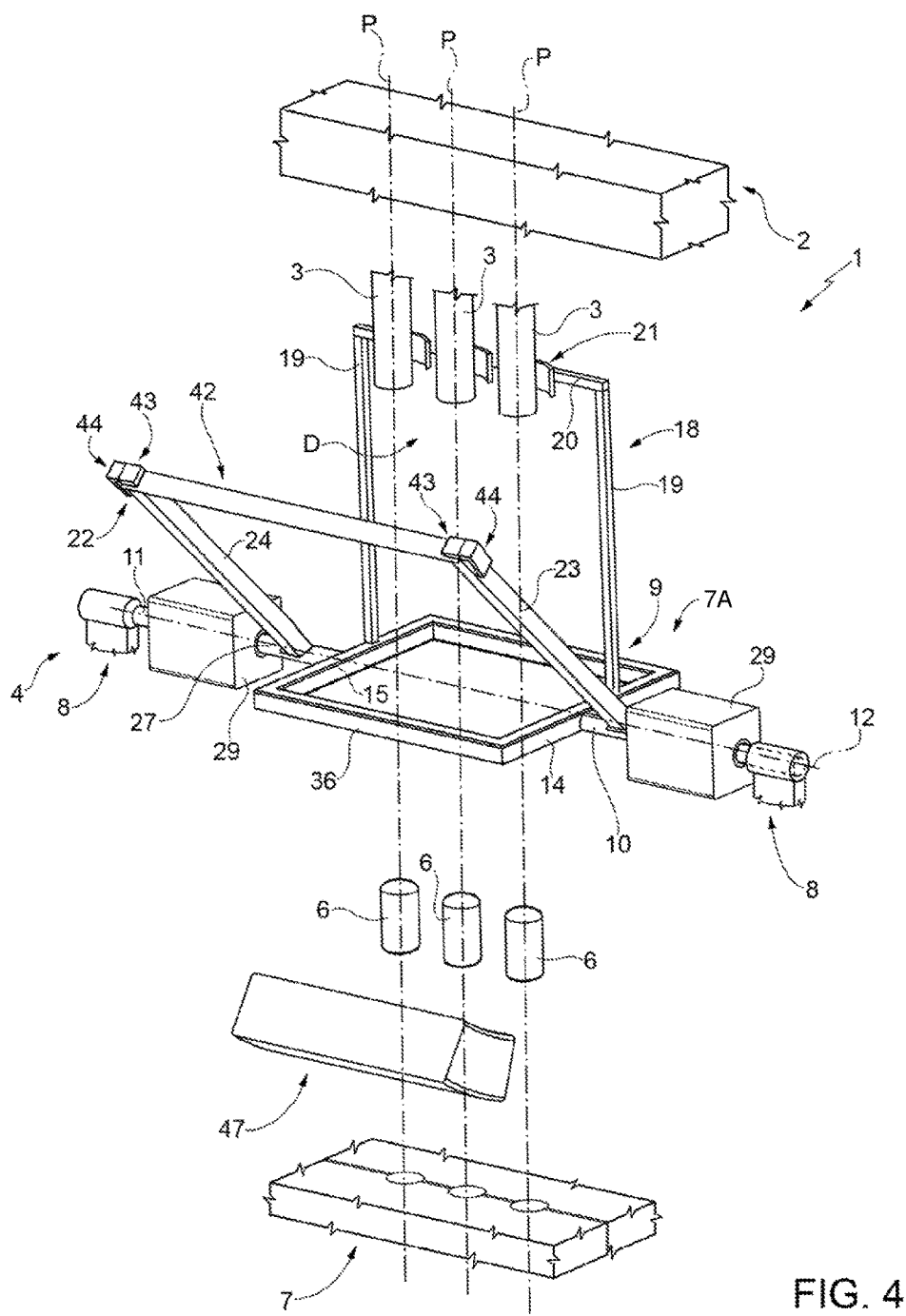
FIG. 4 shows a variant of a detail of FIG. 1.

In the variant shown in FIG. 4, each arm 19 is rotated about axis 12 by a respective motor 29, e.g. of the hollow axis type, coupled directly to the respective pin 10, 11.

Alternatively, the motors are coupled to the respective pins 10,11 by means of the interposition of mechanical transmissions.

Figure 2:
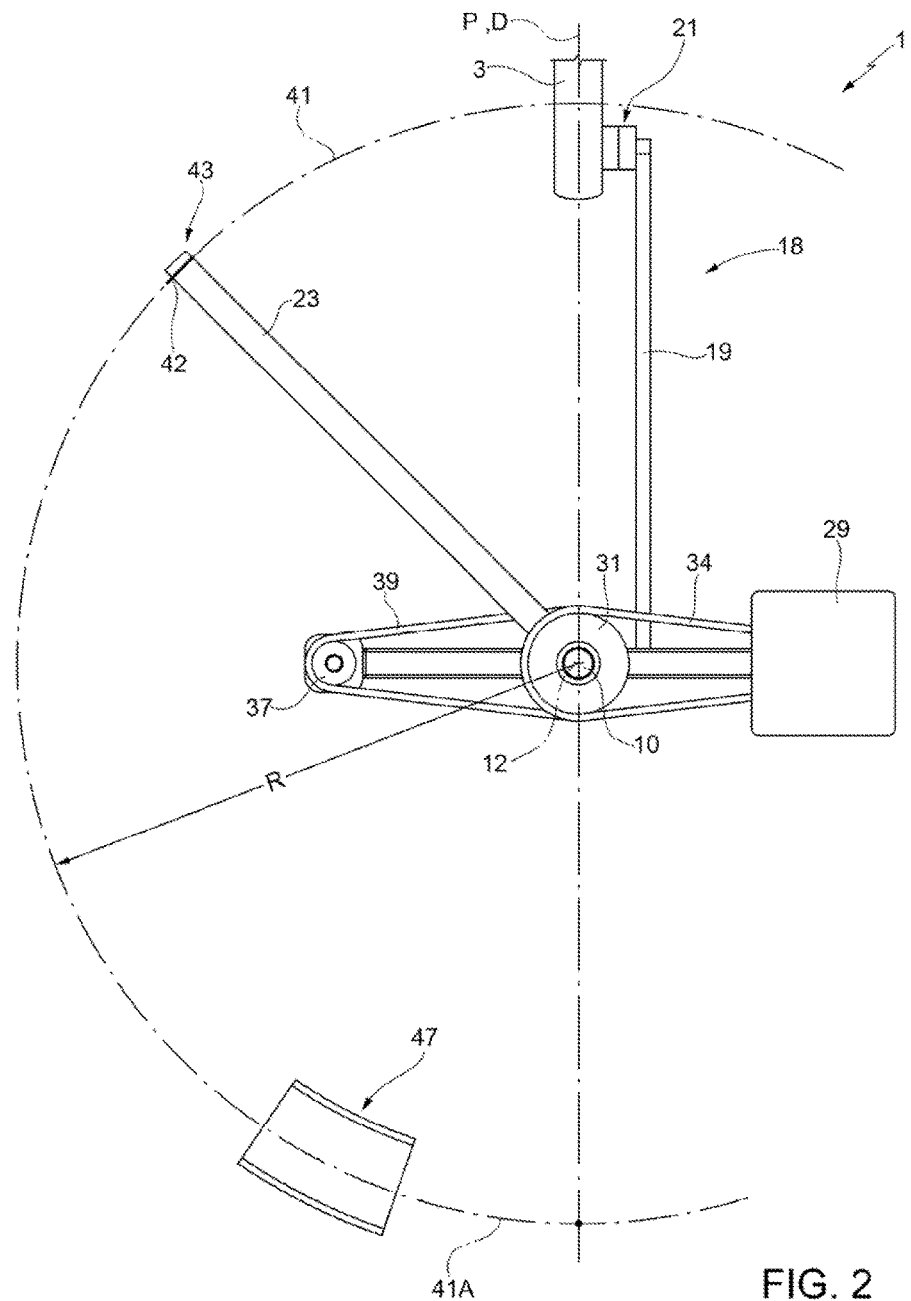
FIG. 2 shows a side elevation view of the device of FIG. 1.

Again with reference to FIG. 1, the cutting device 4 finally comprises an elongated blade 42 for cutting the columns 3 carried by the arms 19 and moveable parallel to itself along a circular cutting path 41 (FIG. 2) centered on the axis 12 and radius R.

In the particular described example, the blade 42 is defined by an elongated metallic blade, conveniently monolithic and, preferably, of harmonic steel, the opposite ends of which are connected to free end portions of the arms 23 and 24 by means of releasable connection devices 43, e.g. of the screw or clamp type, so as to allow to replace the blade relatively rapidly.

With reference to FIG. 5, the piece is conveniently flat and has a rectangular shaped cross section with longer sides 45 which may be either sharp or not.

Alternatively, as shown in FIG. 6, the piece is curved with concavity facing towards the axis 12 and has a rectilinear generating line A parallel to axis 12 and a curved directrix B. Conveniently, the directrix B has a center of curvature lying on the axis 12 and a radius of curvature substantially equal to the radius R of the cutting path 41 traveled by the piece.

Preferably, the thickness S of the piece is variable from 1 to 2 millimeters and the width L is variable from 10 to 30 millimeters.

In all cases, the width L and the thickness S are determined as a function of the length of the piece, i.e. as a function of the number of columns 3 to be cut and of the transverse size of the columns 3 (cross section), in order to provide cutting stability of the piece during the cutting operation to cut the columns simultaneously without diverting from the intended cutting path 41, with consequent dimensional and/or geometry consistency of the gobs.

In addition to the aforesaid pieces, the device 4 allows the use of thin pieces, i.e. thinner than 0.5 millimeters.

In such a case, the device 4 comprises a tensioning assembly 44 of the thin piece, diagrammatically shown and carried by the arms 23 and 24. The assembly 44 may either form part of the devices 43 or not and cooperates with the piece for elastically bending one or both the arms 23,24, which tensions the piece itself by effect of the bending. Alternatively, the arms 23 and 24 are deformable and the device 44 comprises an elastic tensioning assembly, i.e. of the spring type. Empirically, it was observed that even a minimum tensioning of the piece produces a considerable both flexural and torsional stiffening of the thin piece itself, thus increasing stability during the step of cutting.

Finally, again with reference to FIG. 1, the device 4 comprises a cooling assembly 47 (known in itself and not described in detail) arranged along the cutting path 41 in position angularly distanced from the columns 3 and from the downward path of the gobs 6 towards the molds 7 so as to avoid any contact with the glass masses. Conveniently, the cooling assembly 47 is arranged under the horizontal lying plane of the hinge axis 12 and, preferably, along a stretch 41A (FIG. 2) of the path 41 which extends from an intersection point of the path 41 with the plane D towards the columns 3 in the direction of rotation of the blade or arms 23,24.

In use, the motor or motors 29, controlled by the unit 29A, rotate the arms 23,24 about the axis 12 so as to move the piece in only one direction of rotation by uniform motion or at variable speed along the cutting path 41, e.g. to avoid interferences with the gobs 6 which transit towards the molds 7 or to cross either the columns 3 or the cooling assembly 47 at predetermined and variable speeds, e.g. according to the temperature or quantity of columns 3. With regards to the temperature of the piece, it is apparent that the movement of the piece in air along a relatively long path may in itself be sufficient to cool the piece, so that the device 47 may no longer be necessary.

The variant shown in FIG. 3 relates to a cutting device 50, which differs from the device 4 in that the annular structure 9 and the guiding assembly 18 are moveable about the axis 12 with respect to the fixed structure 8. In such a case, the pins 10 and 11 are coupled to the fixed structure 8 in rotational manner about the axis 12 and in axially fixed position and the guiding assembly 18 is moveable, jointly with the annular structure 9, between an approached guiding position of the columns 3 reached during the cut and a distanced position, illustrated in FIG. 3, under the bias of a motor 51 coupled in angular manner to an end portion of the pin 10 protruding beyond the fixed structure 8.

From the above, it is apparent that, with respect to the known solutions, the described devices 4, 50 allow to set the impact speed of the blade against the glass columns 3 freely and independently from the features of the used blade 42, with the objective, on one hand, to cut rapidly in order to cool the stretch of glass columns 3 in contact with the blade 42 as little as possible and, on the other hand, to deform the columns 3 as little as possible and/or to impress transverse actions to the gobs 6, which would move them away from their natural free falling trajectory towards the mold assembly 7.

In addition to this, the described devices 4,50 allow to use elongated blades and, in particular, to use thin, rigid or tensioned, pieces which, precisely because they are thin, have an extremely small impact surface with the glass columns 3 with respect to the thicker blades. Consequently, the transverse actions transmitted by the blade to the glass columns 3 during the cut are extremely low to the extent that the use of guiding devices 21 is no longer needed in some cases.

The impact surface of the blade 42 with the columns 3, but above all the instantaneous or actual cross surface during the crossing of the glass columns 3 is smaller in the case of curved blades with curvature either comparable or equal to that of the path 41 than with flat blades.

Finally, the particular arrangement and shape of the piece allows to cut any number of columns simultaneously and at the same speed 3.

Finally, from the above it is apparent that changes and variations may be made to the described assemblies 4,50 different from those indicated above by way of example.

In particular, the structures 8,9 and 18 could be replaced by constructively different structures, and constructively different could also be the arms 23,24 which could constitute part of a common fork hinged to a fixed structure to rotate about the axis 12.

With this regard, according to a variant (not shown), the axis 12 extends again parallel to the plane D and orthogonally to the conveying path P of the columns, but in position distanced from the plane D itself. This arrangement allows to simplify the structure 9 which, advantageously may comprise a motorized torsion shaft extending coaxially to the axis between the fixed attachment structure 8, to which it is coupled in angularly fixed position and in either fixed or rotational manner about the axis 12. In general, the eccentric position of the axis 12 with respect to the plane D allows to make a large vertical corridor for free transit of the gobs 6 towards the mold assembly 7.

According to a further variant, the motor or motors 29 are controlled by the unit 29A not only to vary the rotation speed of the blade 42 along the path 41 but also to change the direction of rotation of the blade 42 itself as soon as the cut is performed. This allows to cut the columns 3 during an outward stroke and to cut the same columns 3 during a return stroke.

Such an operative method allows to increase the production rate on one side and eliminates the possibility for the blade 42 to intercept the gobs 6 falling towards the molds 7 at the root.

According to a last variant, the frame 18 has a single arm 23,24 which is flexurally and torsionally rigid and the blade 42 either extends or protrudes overhanging from the arm 23,24.

Finally, the shape and geometry of the piece could be different from that shown therein by way of example and/or could have a geometry which is at most filiform but always of width and/or thickness such to avoid a spontaneous or at least partially spontaneous sticking of the gob to the column after the passage of the blade.

The invention claimed is:

1. A cutting device for forming gobs of glass, the cutting device comprising:
a frame;
a single blade;
a movable frame being connected to said frame to rotate said movable frame about an axis;
said moveable frame being connected to said single blade to rotate said single blade along a curved cutting path about said axis; and
a motorized actuating assembly having a motor that is connected to said movable frame to rotate said movable frame about said axis, wherein said single blade moves from a first side of one or more molten glass columns, through an entirety of said one or more molten glass columns to a second side of said one or more molten glass columns opposite said first side to form the gobs of glass, and wherein said single blade is elongated in a direction that is along a direction that is parallel with said axis,
wherein the cutting device only has one blade that is the single blade.

2. The cutting device according to claim 1, wherein said moveable frame comprises two arms, wherein one of said two arms and another of said two arms are arranged on opposite sides of said single blade, and wherein said single blade has opposite end portions that are each connected to one of said two arms.

3. The cutting device according to claim 2, wherein said two arms each extend from said axis.

4. The cutting device according to claim 2, wherein at least one of said two arms are elastically bent to tension said single blade along said direction that is parallel with said axis so that said single blade is tensioned.

5. The cutting device according to claim 2, wherein said motor is a single motor, and wherein said motorized actuating assembly further comprises a mechanical transmission, which is interposed between said two arms and is operated by said motor to rotate said two arms simultaneously.

6. The cutting device according to claim 1, wherein said single blade is tensioned along said direction that is parallel with said axis and is carried by said moveable frame so that said single blade is tensioned.

7. The cutting device according to claim 1, wherein said single blade is flat.

8. The cutting device according to claim 1, wherein said single blade is a curved blade and has a concavity facing said axis.

9. The cutting device according to claim 8, wherein said concavity has a curvature radius; said curved cutting path having a path radius equal to said curvature radius.

10. The cutting device according to claim 1, wherein said frame comprises a portion that guides said one or more molten glass columns.

11. The cutting device according to claim 10, wherein said one or more molten glass columns are along one or more conveying paths, wherein the cutting device further comprises a motor to rotate said portion that guides said one or more molten glass columns independently from said moveable frame, between an approached guiding position, in which said portion that guides said one or more molten glass columns is aligned with said one or more conveying paths, and a distanced position, in which said portion that guides said one or more molten glass columns is angularly distanced from said one or more conveying paths.

12. The cutting device according to claim 11, wherein said motor to rotate said guiding assembly rotates said frame.

13. The cutting device according to claim 10, wherein said moveable frame and said frame are coupled to a fixed attachment structure to rotate about said axis.

14. The cutting device according to claim 1, wherein said actuating assembly rotates said single blade in a single direction of rotation or in reciprocating manner, at constant or variable speeds.

15. The cutting device according to claim 1, wherein said one or more molten glass columns are along one or more conveying paths, and wherein said one or more conveying paths intersects with said axis.

\* \* \* \* \*